Aug. 8, 1944. L. F. BORCHARDT ET AL 2,355,414
VAPORIZING DEVICE
Filed Dec. 12, 1942
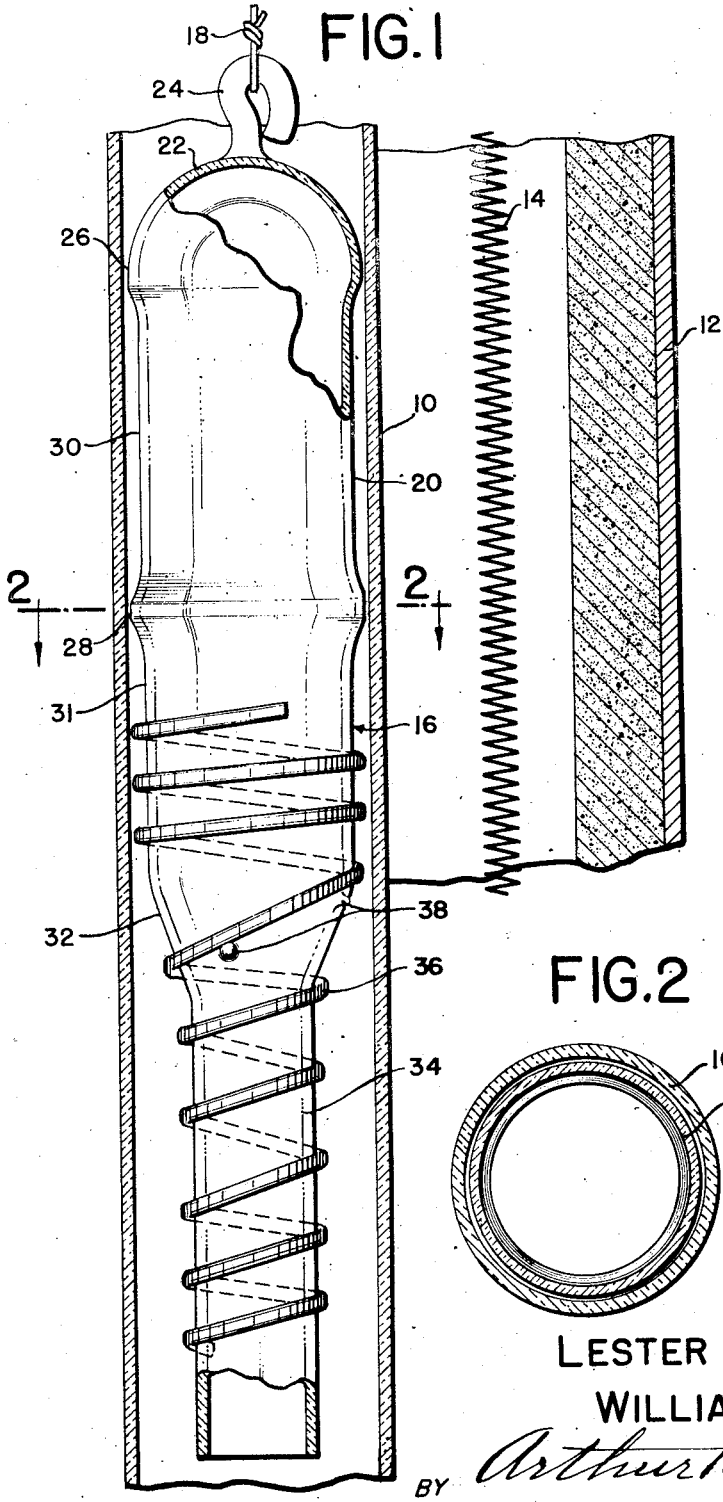
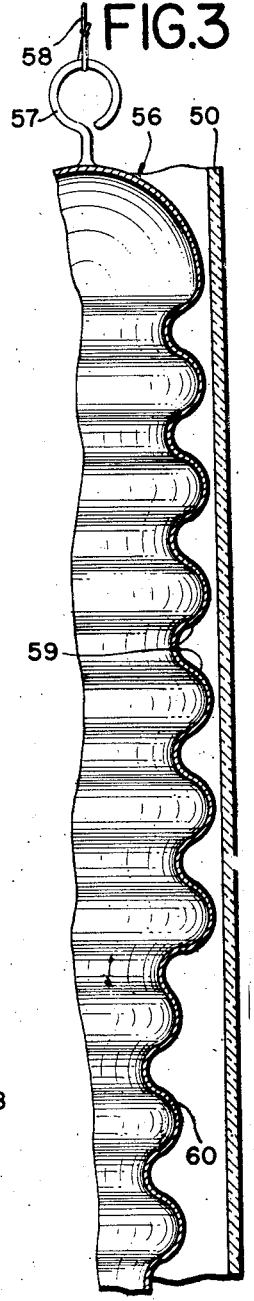
INVENTORS:—
LESTER F. BORCHARDT
WILLIAM BRASTAD
BY Arthur R. Abyle
ATTY.

Patented Aug. 8, 1944

2,355,414

UNITED STATES PATENT OFFICE 2,355,414

VAPORIZING DEVICE

Lester F. Borchardt and William Brastad, Minneapolis, Minn., assignors to General Mills, Inc., a corporation of Delaware Application December 12, 1942, Serial No. 468,828

5 Claims. (Cl. 219—38)

This invention relates to means for vaporizing a liquid or for melting and vaporizing a solid material like powdered ergosterol in a heated glass tube under a high vacuum.

An object of this invention is to provide a simple, inexpensive and efficient means of this kind which adapts itself for use in a straight length of glass tubing and particularly one which stands vertically.

This and other objects as will hereinafter appear, are accomplished by this invention which is fully described in the following specification and shown in the accompanying drawing in which Figure 1 is a partial vertical section through an activation tube embodying the invention;

Fig. 2 is a section on the line 2—2 of Fig. 1; and

Fig. 3 is a partial vertical section similar to Fig. 1 showing a modified form of the invention.

The embodiment illustrated in Figs. 1 and 2 comprises a straight glass tube 10 enclosed in a suitable insulating housing 12 with electrical resistance coils 14 disposed therein about the tube so as to subject the tube to a desired degree of heat.

Within the tube a member 16 is secured at a desired height preferably by suspending by a wire 18. This member comprises a body 20 preferably of hollow glass having a convexly arcuate upper part 22 terminating in an eye 24 to which the wire 18 is attached.

The periphery 26 of the arcuate upper portion nearly touches the glass tube as preferably does a portion 28 separated by a reduced intermediate portion 30. Below the bulging portion 28 is another reduced portion 31 which narrows still further at 32 to a straight depending sleeve 34.

A wire 36 preferably of metal is wound about the middle and lower portion of the member 16 and is partly retained in place by spaced projections 38.

Material to be melted and vaporized, like powdered crystalline ergosterol, is fed by means not shown at substantially a constant rate to the upper part 22. Here it is caught, melts and runs down over the outer surface of the member 16. When it reaches the wire 36 it is further retarded, this liquid flowing both along the wire and over it as well as over the glass in a thin film which in the presence of heat and vacuum rapidly evaporates.

The enlarged portions 26 and 28 closely approximate the interior diameter of the tube 10 so as to catch and retard any sudden surge of material particularly solids so as to insure all of it melting before it passes these enlarged portions.

The reduced lower portion forming the sleeve 34 is spaced some distance from the glass tube 10 and hence permits the rapid evaporation of the liquid flowing over it which is highly heated by the time it reaches this point.

While this apparatus is designed primarily for use with a solid material like ergosterol which is to be vaporized, it will be understood it will serve also for the vaporization of liquids.

In Fig. 3 is shown a modified form of the invention in which a hollow metal member 56 is suspended by a wire 58 attached to an eye 57 within a glass tube 50. The outer surface of the member 56 is provided with annular grooves 59 formed preferably parallel and horizontally so as to retard the downward flow of the liquid while heating and vaporizing it.

This member may also have a reduced lower portion 60 to provide for the more ready vaporization.

Thus it will be seen we have provided a very simple and efficient means for liquefying and vaporizing ergosterol and the like and one which is simple and inexpensive to install and maintain.

While we have shown and described but a few embodiments of our invention, it is to be understood that it is capable of many modifications. Changes, therefore, may be made which do not depart from the spirit and scope of our invention as disclosed in the appended claims.

We claim as our invention:

1. Apparatus for melting and vaporizing a solid dropped upon it from above comprising a straight vertical tube, a member positioned therein comprising a body fitting loosely within the tube and having a spiral on its outer surface so that a liquid flowing down the body will flow along and over the spiral, the body having a reduced lower portion with the spiral extending about a portion of the upper part of the body where the spiral nearly engages the inner surface of the tube, and means for heating said member.

2. Apparatus for melting and vaporizing a solid dropped upon it from above comprising a straight vertical tube, a member positioned therein comprising a body fitting loosely within the tube and having a spiral on its outer surface so that a liquid flowing down the body will flow along and over the spiral, the body having a reduced lower portion with the spiral extending about a portion of the upper part of the body where the spiral nearly engages the inner surface of the tube, the spiral extending down to and about the reduced lower portion, and means for heating the member.

3. Apparatus for melting and vaporizing a solid dropped upon it from above comprising a straight vertical tube, a member positioned therein comprising a body having spaced portions fitting loosely within the tube with an intermediate somewhat reduced portion between said spaced portions, the lower portion of the body being reduced, the body being hollow and open at the bottom, and a metal wire wound as a spiral on the lower part of the upper portion and continuing down around the lower reduced portion, and means for heating the member.

4. Apparatus for melting and vaporizing a solid dropped upon it from above comprising a straight vertical tube, a member positioned therein comprising a body having spaced portions fitting loosely within the tube with an intermediate somewhat reduced portion between said spaced portions, the lower portion of the body being reduced, the body being hollow and open at the bottom, and a metal wire wound as a spiral on the lower part of the upper portion so as to nearly touch the tube at this level and continuing down around the lower reduced portion, and means for heating the member.

5. Apparatus for melting and vaporizing a solid dropped upon it from above comprising a straight vertical tube, a member suspended therein comprising a body having an convexly arcuate top and fitting loosely within the tube and having a spiral on its outer surface so that a liquid flowing down the body will flow along and over the spiral, and means for heating the member.

LESTER F. BORCHARDT.
WILLIAM BRASTAD.